United States Patent [19]

Kawashima et al.

[11] Patent Number: 5,015,523

[45] Date of Patent: May 14, 1991

[54] COATED SYNTHETIC RESIN LENS

[75] Inventors: Hiroshi Kawashima; Mikito Nakashima; Takao Mogami, all of Nagano, Japan

[73] Assignee: Seiko Epson Corporation, Tokyo, Japan

[21] Appl. No.: 13,102

[22] Filed: Feb. 10, 1987

Related U.S. Application Data

[63] Continuation-in-part of Ser. No. 635,031, Jul. 27, 1984, abandoned.

[30] Foreign Application Priority Data

Jul. 29, 1983 [JP] Japan ............................... 58-138769

[51] Int. Cl.$^5$ ..................... B32B 27/06; B32B 27/08; B32B 27/30; B05D 1/36
[52] U.S. Cl. .................................. 428/336; 427/162; 428/447; 428/451
[58] Field of Search ................. 428/447, 45, 412, 331, 428/431, 336; 427/169, 162

[56] References Cited

U.S. PATENT DOCUMENTS

| | | | |
|---|---|---|---|
| 4,196,246 | 4/1980 | Takayama et al. | 427/166 |
| 4,372,987 | 2/1983 | Ganner et al. | 427/166 |
| 4,387,960 | 6/1983 | Tani | 350/164 |
| 4,395,463 | 7/1983 | Kray | 428/447 |
| 4,405,679 | 9/1983 | Fejiona et al. | 428/412 |
| 4,435,476 | 3/1984 | Philips et al. | 428/412 |
| 4,436,851 | 3/1984 | Vaughn, Jr. | 524/588 |
| 4,442,168 | 4/1984 | White et al. | 428/412 |
| 4,490,495 | 12/1984 | Weber | 428/412 |
| 4,559,271 | 12/1985 | Doin et al. | 428/447 |

*Primary Examiner*—Allan M. Lieberman
*Attorney, Agent, or Firm*—Blum Kaplan

[57] ABSTRACT

Coated synthetic resin lenses having a primer layer of a copolymer of an acrylic and/or methacrylic monomer and an aromatic vinyl compound between the base material and a cured abrasion resistant layer of colloidal silica and an inorganic anti-reflection coating are provided. The cured coat of colloidal silica has a particle diameter between about 1 and 100 millimicrons and is dispersed in a hydrolyzed silane compound. The organic primer coating improves adhesion properties between the base material and the cured abrasion-resistant layer resulting in coated lenses of improved impact resistance.

30 Claims, 2 Drawing Sheets

COATED SYNTHETIC RESIN LENS

This is a continuation-in-part application of co-pending application Ser. No. 06/635,031, filed July 27, 1984.

BACKGROUND OF THE INVENTION

This invention relates to a coated synthetic resin lens and, more particularly, to lenses of high impact resistance with an organic primer coating disposed on the lens base with a surface hard coating on the primer coating, the primer coating improving the abrasion resistance, reducing surface reflection and improving adhesion between the coating layers.

Synthetic resin lenses have become popular substitutes for inorganic glass spectacle lenses since the adoption of standards for such lenses by the U.S. Food and Drug Administration in 1972. The increased use of synthetic resin spectacle lenses results from their advantages over glass lenses, including increased safety, lighter weight, more pleasing appearance, good tintability by dispersed dyes and good processability.

At present, synthetic ophthalmic lenses are prepared primarily using synthetic resin base materials such as polydiethylene glycol bisallyl carbonate resin, otherwise known as "CR-39". CR-39 synthetic base materials are popular because they have good abrasion resistance and are relatively easy to process.

Recently there has been an increased demand for higher quality synthetic resin lenses, specifically, thin synthetic resin lenses made of highly refractive resins. U.S Pat. No. 4,369,298 issued to Y. Kida discloses a synthetic resin lens prepared using a base material formed from a resin of aromatic compounds. In addition, polycarbonate and polymethyl methacrylate resin base materials are available.

One disadvantage of synthetic lenses is that they tend to scratch or scar more easily than glass lenses. In an effort to overcome this disadvantage, improved synthetic products have been developed and several types are now available.

Several methods for providing increased abrasion resistance are also available. These methods include use of silicon, melamine or acrylic resin coatings as abrasion resistant coatings. At present, the abrasion resistant properties of a silicon hard coating are superior to the abrasion resistant properties of coatings formed by other methods. Several silicon-type coating compositions and coating techniques exist and include, for example, those disclosed in U.S. Pat. Nos. 3,986,977; 4,027,073 and 4,442,168, all of which disclose coating compositions of colloidal silica and organopolysiloxane.

In addition, U.S. Pat. No. 4,211,823 discloses coatings derived from silica fine particles, hydrolyzates of silane compounds containing at least one epoxy group and aluminum chelate compounds. Articles having these coatings are also disclosed. U.S. Pat. No. 4,355,135 discloses tintable coating compositions. U.S. Pat. No. 3,984,881 discloses a coating composition of hydrolyzed tetraalkoxysilane compounds, hydrolyzates of alkyltrialkoxysilane and metal catalysts. The metal catalysts can include thiocyanate nitrite, aluminate and carbonate. All of these compositions are coated, heated and cured. Accordingly, synthetic resin lenses having excellent abrasion resistance are provided.

As techniques for providing improved abrasion resistant coatings are developed, the number of synthetic resin base materials that can be used expands. In addition to polycarbonate and polymethyl methacrylate, new base materials having other advantages become available. However, it is difficult to achieve good adhesion properties between the synthetic resin base material and the abrasion resistant coating, a factor which causes severe problems.

The properties of a thin film such as an abrasion resistant coating depends to a great extent on the hardness, viscidity (stickiness), elasticity and flexibility of the film. The abrasion resistance of an abrasion resistant coating also depends on the adhesion properties between the coating and the base material. It must be remembered that scratches in synthetic resin lenses can be caused by numerous factors and that most scratches start small, but deepen and enlarge.

In the case of a base material prepared from a polycarbonate or acrylic resin, primer coatings have been experimentally used to adhere the abrasion resistant coating to the base material. For example, in U.S. Pat. Nos. 4,207,357 and 4,284,685, emulsion primer compositions in which a thermoset acrylic polymer is dispersed in water containing hydroxyethylether are disclosed. These compositions are used as primers for polycarbonate resin base materials.

U.S. Pat. No. 4,405,679 discloses several acrylic and vinyl polymers with substitutent groups that are used as primer coatings. Additionally, the disclosure shows colloidal silica filled with polyorganosiloxane as a major constituent of an abrasion resistant coating.

In view of the problems of adhesion between the layers of synthetic resin spectacle lenses, the patented compositions have several disadvantages. For example, adhesion between the primer coating and the abrasion resistant coating is inferior. Accordingly, selection of proper primer and abrasion resistant coating compositions becomes critical.

Another disadvantage of liquid primer coatings is that they generally have insufficient weatherability and cause the abrasion resistant coating to be gradually peeled off. Emulsion type primer compositions are superior to liquid type compositions with respect to adhesion properties. However, abrasion resistant coating compositions prepared in accordance with the invention have the best adhesion properties.

Furthermore, there is an increasing consumer demand for ophthalmic lenses having reduced surface reflection. In the case of lenses having a reflective index of 1.5, one side of the lens reflects about 4% of the light and both sides reflect about 8%. The reflected light makes a user feel dizzy or causes an image to be blurred. In order to overcome this disadvantage, anti-reflection treatments on synthetic resin lenses as well as on camera lenses are used.

Anti-reflection treatment of synthetic resin lenses has disadvantages. For example, the anti-reflection coating deteriorates severely when subjected to heat cycles of high and low temperatures. This is due to the differences in flexibility and coefficient of thermal expansion between the organic lens and the inorganic thin film anti-reflection coating. In addition, the anti-reflection coating tends to peel following crack generation in the synthetic lens. It is also difficult to improve the adhesion between the synthetic resin lens base material and the interface of the deposited anti-reflection material even by the use of vacuum deposition of the anti-reflection material. For these reasons, synthetic resin lenses having anti-reflection coatings are inferior to inorganic glass lenses in terms of durability.

There are several methods for solving these problems. U.S Pat. No. 4,196,246 discloses an inorganic material of silicon oxide laminated between the base material and the anti-reflection coating in order to improve abrasion resistance and durability. Many products on the market are of this type. A layer of an inorganic material having a thickness between about 0.5 and 3 μm is provided in order to increase the abrasion resistance of the coated anti-reflection film. However, there is then insufficient adhesion between the inorganic coating and the synthetic resin lens base material and, therefore, these products have disadvantages in terms of durability and quality. Specifically, the lenses peel under high humidity conditions caused by sweat or placement in a bathroom. Accordingly, adhesion and durability between the layers is not satisfactory. When the inorganic film is thickened to provide sufficient abrasion resistance, adhesion is reduced as a result of the reduced surface tension of the base material. A further problem arises because synthetic resin lenses having an inorganic film provided by deposition have inferior impact resistance and do not meet FDA impact resistance standards.

As discussed, in order to improve abrasion resistance and keep surface reflection low, abrasion resistant coatings of the type shown in U.S. Pat. Nos. 3,986,997; 4,027,073 and 4,442,168 are provided and inorganic anti-reflection films are deposited on the abrasion resistant coating. However, when the inorganic anti-reflection materials are deposited on synthetic resin lenses having cured abrasion resistant coatings formed of colloidal silica and hydrolyzates of methyltrimethoxyethylsilane as major constituents, cracking occurs in the inorganic film and peeling occurs between the inorganic film and the cured coating.

U.S. Pat. Nos. 4,211,823 and 4,355,135 disclose tintable cured coatings. Anti-reflection coatings of inorganic material can be deposited on the lens, but adhesion between the cured coat and the anti-reflection coating is not sufficient and abrasion resistance deteriorates substantially. Furthermore, the smoothness of the lens surface is sacrificed and peeling or cracking occurs due to the formation of blisters. Accordingly, lenses prepared in this manner are not fully satisfactory.

In addition, abrasion resistance deteriorates when anti-reflection coatings are coated on the abrasion resistant coating. The deterioration of characteristic properties often results from inferior adhesion of the layers of such a hybrid material. The adhesion between the abrasion resistant coating, specifically, the organopolysiloxane film, and the anti-reflection coating is poor because the organopolysiloxane film does not have sufficient affinity with the inorganic material.

Accordingly, it is desirable to provide a synthetic resin lens having improved abrasion resistance, high impact resistance, reduced surface reflection, good durability and good adhesion properties between the inorganic anti-reflection coatings.

SUMMARY OF THE INVENTION

Generally speaking, in accordance with the invention, a synthetic resin lens having an adhesion promoting organic primer layer between the lens base material and a cured abrasion resistant layer of a coating composition of colloidal silica is provided. An inorganic anti-reflection coating may be formed on the cured coat. The organic primer coating is a copolymer of an acrylic and/or methacrylic compounds and an aromatic vinyl compound as major constituents and is applied between about 0.1 to 2 μ in thickness. The cured coat of colloidal silica has a particle diameter between about 1 and 100 millimicrons and is dispersed in a hydrolyzed silane compound represented by the general formula $R^1$—Si—$(OR^2)_3$ wherein $R^1$ is an epoxy group, $R^2$ is a hydrocarbon group having between about 1 and 4 carbon atoms, an alkoxyalkyl group having between about 1 and 4 carbon atoms or an acyl group having between about 1 and 4 carbon atoms. The synthetic resin lenses prepared in accordance with the present invention have improved adhesion properties between the base material and the cured abrasion-resistant layer due to the primer layer. The lenses have improved abrasion resistance, high impact resistance, reduced surface reflection, good durability and good adhesion properties between the layers.

Accordingly, an improved synthetic resin lens having increased impact resistance, improved surface hardness, increased abrasion resistance, reduced surface reflection and improved adhesion properties between the layers is provided.

Another object of the invention is to provide a method for forming an improved synthetic resin lens.

A further object of the invention is to provide an improved coated synthetic resin ophthalmic lens having a base material, an organic primer layer coated on the surface of the base material, a cured coat of organopolysiloxane filled with silica coated on the organic primer layer and an inorganic anti-reflection coating deposited on the organopolysiloxane layer.

Still another object of the invention is to provide an improved coated synthetic resin ophthalmic lens having a base material, a primer coating layer consisting of methacryl and/or acryl and styrene copolymer formed on the base material, a cured inorganic coat formed of a coating composition including colloidal silica in a hydrolyzed silane compound formed on the primer coating layer and an inorganic anti-reflection coating deposited on the cured inorganic coat.

A still further object of the invention is to provide an improved coated synthetic resin lens having a high impact resistance as a result of an organic primer layer coated on the base material where the impact force is to be dispersed.

Another object of the invention is to provide a primer coating on the base material of a synthetic resin lens where the primer coating is formed of a cured coat of an emulsion composition consisting of acrylic-styrene copolymer or a primer coating formed using a cured coat containing reactive polymer in order to improve impact resistance.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figure 3:
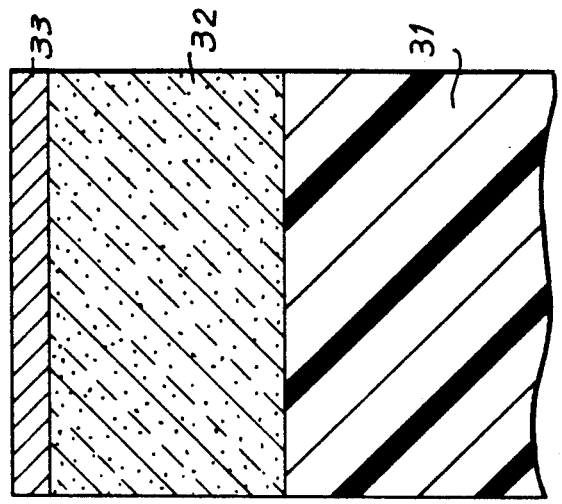
FIG. 3 is a side elevational view of a coated synthetic resin lens prepared for purposes of comparison with the lenses of the present invention.

The coated synthetic resin lens prepared in accordance with the invention may utilize a wide variety of synthetic resin base materials having high refractive indices. The primer coating is an emulsion dispersion or solution of a copolymer primarily of acrylic and/or methacrylic compounds and aromatic compounds that is cast and dried to a thickness of 0.1 to 2 μ. A silicon coating either of organic silica compounds containing epoxy groups and colloidal silica or a coating of organic silane compounds containing epoxy groups or transfunctional silane is applied to the primer coating. Curing catalysts and polyfunctional epoxy compounds are added, if necessary, and the silicon coating is coated on the primer coating and cured to a thickness of between about 1 and 10 μ by heating. The anti-reflection coating is formed of laminated optical thin films of inorganic compounds.

The Base Material

The synthetic material for use as the base material for the synthetic resin lens can be any of the following materials:

(1) Polydiethylene glycol bisallyl carbonate resins. These resins are known as CR-39 and are popular in the United States.

(2) Polycarbonate resins. Polycarbonate resins are widely used as spectacle lenses because they are safe. Such resins are sold under many tradenames. Examples of polycarbonate resins that are suitable for use include those described in U.S. Pat. No. 3,305,520 and reported in Christopher and Fox, "Polycarbonates", pp. 161-176 (1962). In addition to diethylene glycol bisallyl carbonate, bis-phenol type poylcarbonates such as 4,4'-isopropylidene diphenol carbonate are useful.

(3) Synthetic reins prepared from a copolymer formed by radical-polymerizing comonomers of formulae I and II as major constituents:

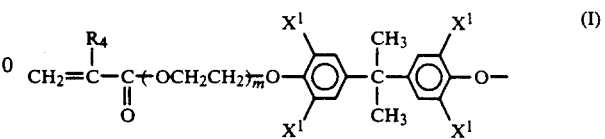

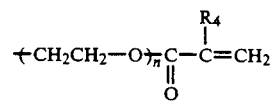

wherein $R^4$ is hydrogen or methyl, $X^1$ and $X^2$ are hydrogen or halogen other than fluorine, and m and n are both integers having a total between 0 and 8, inclusive. The comonomer includes between about 20 and 80% by weigh of component I and between about 80 and 20% by weight of component II. One of such resins has been commercialized in Japan as the lens material under the tradename HI LORD.

(4) A resin material prepared by radical polymerizing comonomers of formulae III, IV and V as major constituents:

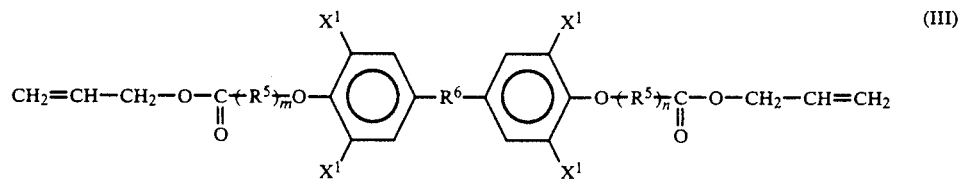

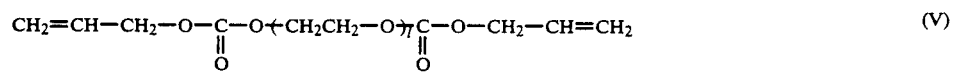

wherein $R^5$ is $-O-C_2H_4-$, $-O-C_3H_3-$ or $$-O-CH_2CHCH_2,$$
$$\phantom{-O-CH_2CH}|$$
$$\phantom{-O-CH_2CH}OH$$

$R^6$ is $-O-$, $-S-$, $-SO^2-$, $-CH_2-$ or $-C(CH_3)_2-$, $X^1$ is halogen other than hydrogen or fluorine, l is an integer between 1 and 10, inclusive and m and n are both integers having a total between about 0 and 8, inclusive.

The comonomer includes between about 25 and 80% by weight of component III, between about 5 and 75% by weight of component IV and between about 0 and 20% by weight of component V.

(5) Polymethyl methacrylate resin.
(6) Polystyrene resin.
(7) Diallyl phthalate resin.

Of these synthetic resin materials, (3) is described in U.S. Pat. No. 4,369,298 and is being watched with interest as a promising new optical material. The material has a refractive index of about 1.6, which is considered to be high. When a strong power lens is prepared using this material, the thickness of the lens can be reduced by about 25% and the weight can be reduced compared to lenses prepared using polydiethylene glycol bisallyl carbonate (CR-39) although the degree of the lens is a factor in determining the actual weight reduction.

When a lens is prepared from materials (1), (3) or (4), the monomer, initiator, ultraviolet absorber and the like are injected into a glass mold, surrounded by a gasket and cast to form a thermosetting lens. With respect to thermoplastics (2), (5) and (6), the lens is formed by injection molding.

The Primer Coating Composition

Suitable organic polymers for use as the primer coating are copolymers of acrylic and/or methacrylic compounds and aromatic vinyl compounds as major constituents. Examples of acrylic and methacrylic monomers for use in preparing the copolymers include esters formed of acrylic acid or methacrylic acid with lower alcohols such as methanol, ethanol, isopropanol, n-butanol and the like or esters formed of acrylic acid or methacrylic acid and aromatic compounds containing hydroxyl groups such as benzyl alcohol and the like. Examples of aromatic vinyl compounds include styrene, chlorostyrene, bromostyrene and the like. In addition, the following materials can be included in amounts of less than about 5 weight percent of the total resin composition:
glycidyl acrylate
aminoethyl acrylate
dimethylaminoethyl acrylate
3,4-epoxycyclohexylethyl acrylate
tetrahydrofurfuryl acrylate
2-hydroxy-3-phenyloxypropyl acrylate
ethylcarbitol acrylate
2-hydroxyethyl acrylate
2-hydroxypropyl acrylate
2-acryloyloxyethyl succinate
2 acryloyloxyethyl phthalate
methacrylates of the above compounds
Also, acrylates and methacrylates of polyhydric alcohols:
ethylene glycol
diethylene glycol
polyethylene glycol
glycerol
trimethylolpropane
neopentyl glycol
1,6-hexanediol
octylene glycol and the like. Also,
acrylic acid
methacrylic acid
vinyl acetate It is desirable for the copolymer to include at least 20% by weight of methyl methacrylate and at least 10% by weight of styrene. These comonomers can be used even if they are radical-copolymerized in organic solution. In order to obtain primer coatings having excellent weatherability and adhesion properties, it is desirable to use emulsion-polymerized copolymers obtained by dispersing cation surfactant, anion surfactant, surface active monomers or water-soluble polymers such as polyacrylamide into water to form a colloidal dispersion.

The particle diameter of emulsion-polymerized copolymer is preferably between about 10 and 200 m$\mu$. When a copolymer is polymerized in solution, ultraviolet absorber is preferably added in order to improve weatherability.

The following materials can be added to the compositions of either emulsion or solution primer coatings in order to control viscosity, evaporation rate and weatherability: water, alcohols such as methanol, ethanol, isopropanol, n-butanol, ethylene glycol, alkoxyethanol (otherwise known as Cellosolve) including methyl cellosolve, ethyl cellosolve, n-butyl cellosolve, esters of methyl cellosolve, ethyl cellosolve and n-butyl cellosolve, diethylene glycol monoethyl ether, diethylene glycol monobutyl ether, diethylene glycol monobutyl ether acetate (butyl carbitol acetates), carbonates such as propylene carbonate, and amides such as dimethylformamide and dimethylacetamide. Also, ethers such as dioxane, tetrahydrofuran, ketones including acetone, methyl ethyl ketone, methyl isobutyl ketone, esters such as methyl acetate, butyl acetate, BTX such as toluene, xylene, alkanes such as petroleum ether, benzine, and solvents containing hydrogenated compounds including Freon ® and methane dichloride may be included.

In addition, it is desirable to include a silicon surfactant or fluorine surfactant to be added to the primer coating solution in order to reduce surface tension and keep the coating surface smooth.

In order to obtain a primer coating having desirable properties, the concentration of the primer coating material is preferably between about 2 and 10% by weight. However, since adhesion properties vary depending on the combination of the primer polymer and the solvent, i.e. the properties are determined by the affinity between the polymer and the solvent, the concentration of primer polymer is determined by the final thickness of the primer coating composition that is to be achieved.

The primer coating can be coated on the lens using dipping, spinning, spraying and flow coating methods and the like. When a dipping method is used, the lifting speed is preferably between about 2 and 40 cm/min in order to obtain a uniform film. When a spinning method is used, the rotation rate is preferably between about 500 and 4000 rpm.

The primer coating composition is dried and cured at a temperature between about room temperature and 100° C., which is considered to be a low temperature, for a period of between about 5 minutes and 2 hours. Accordingly, the thickness of the primer coating layer can be selected to be between about 0.1 and 2 $\mu$. When the thickness of the primer coating composition is less than about 0.1 $\mu$, the adhesion between the base material and the anti-abrasion cured coating is insufficient. Furthermore, the impact resistance is reduced to an undesirably low level. When the thickness of the primer coating layer is more than about 2 $\mu$, waterproofing properties are deteriorated. Accordingly, when the lens is dipped into hot water for an extended period of time, the coating is undesirably fogged. The curing method for the primer coating is connected to the hardness of the coating.

One method for forming the primer coating is to form one that is independent of the hard coating. This process requires that the primer coating solution be coated, dried and heated at a temperature between about 60° C. and 100° C. for a period of between about 20 minutes and 2 hours. In this manner, the emulsion particles are melted and a mesh-like structure having a polymer chain in the primer coating film is formed. This provides a uniform, precise primer coating. The glass transition point, Tg, or polymer softening point of the major primer material is preferably less than about 50° C. Alternatively, solution-type primer coating materials can also be used. Molded products obtained by this method have excellent impact resistance but are inferior in terms of chemical durability, i.e., solvent resistance and the like. However, this does not create a great problem in terms of usage.

The alternate method for forming the primer coating layer is to use compositions derived from emulsion polymers to the extent possible. With respect to emulsions, organic polymers having nearly spherical particles of 10 to 200 m$\mu$ diameter are dispersed in a dispersion medium. These particles are fine, have large surface energy and are dispersed in suspension. However, when coating compositions are coated on the base material using this method, each of the surface active particles tends to be contacted and the particles are adhered to one another since the solvent is evaporated. The primer coating is heated at a temperature of less than the Tg point of the primer constituents plus 50° C. or at less than the temperature of the melting or softening point of the primer constituents. The temperature is carried out at a relative humidity of greater than about 35% when room temperature is converted to 20° C. As a result, a porous film is obtained. Then heat treatment is carried out for a period of greater than about 5 minutes. Preferably, the heat treatment is carried out for a period between about 5 minutes and 2 hours in order to control the variation of production cycles and coating quality. The time is a function of the heating temperature. Specifically, when the heating temperature is close to the Tg point plus 50° C., the melting point or the softening point, the heating time is short. When the heating temperature is relatively low, the heating time is longer.

The primer coating layer is significant when a silicon hard coating is to be coated on the lens and cured by heating. This improves adhesion between the base material and the silicon hard coating yielding increased impact resistance, chemical durability, waterproofing and resistance to humidity without fully controlling the process.

The primer coating was observed through an electron microscope and it was determined that the contact portion of the primer particles are partly melted and silica ultrafine particles are dispersed in the gap between the spherical primer particles. Accordingly, the strong adhesion properties and the flexibility required to relax the impact and chemical resistance due to silica constituents can readily be explained. Silica constituents are dispersed into the gap of the primer particles and the thickness of the primer coating increased by between about 20 and 25%. Accordingly, it was necessary to control the thickness of the primer coating to between about 0.1 and 2 $\mu$.

The primer coating solution is preferably between about 5 and 40% water by weight, between about 60 and 90 % by weight of at least one component selected from alcohols, cellosolve, carbitols, amides and between about 0 and 10% by weight of at least one component selected from esters of cellosolve or carbitols, propylene carbonates, ethylene glycol, esters, acetate and the like.

The Silicon Hard Coating Composition

The silicon coating is a hard coating that is coated on the primer composition. The hard silicon coating composition has the following components as major constituents:
 A. colloidal silica having a solids content between about 35 and 75% by weight;
 B. an organic silane compound containing epoxy groups and having a solids content between about 25 and 50% by weight;
 C. additives having a solids content between about 0 and 25% by weight; and
 D. between about 60 and 80% by weight of a solvent in a coating solution.

Component A is a colloidal silica having a particle size diameter of between about 1 and 100 m$\mu$. Component B is at least one of a mixture of silane compounds represented by the general formula:

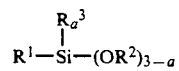

$$R^1-\underset{\underset{\displaystyle R_a^3}{|}}{Si}-(OR^2)_{3-a}$$

wherein $R^1$ is an organic containing epoxy group, $R^2$ is a hydrocarbon group having 0 or 1 carbon atoms, an alkoxyalkyl group or an acyl group having 0 or 1 carbon atoms, $R^3$ is a hydrocarbon group having from 1 to 4 carbon atoms and a is 0 or 1. Component B can be hydrolyzed and/or partially condensed. Component C is added in order to maximize the effects of each of the other additives.

The colloidal silica of component A is obtained by dispersing macromolecular silica anhydride into a dispersing medium. The dispersing medium can be water, an alcohol, or a cellosolve, all of which are well known and commercially available. For purposes of this invention, colloidal silica having a particle size diameter between about 5 and 40 m$\mu$ is especially desirable. The colloidal silica increases the rigidity and humidity resistance of the cured coat and increases the affinity of the silicon hard coat for the anti-reflection coating. Accordingly, the structure of the anti-reflection coating is strengthened and durability is improved. With respect to the dispersing media, methanol, ethanol and isopropanol are particularly effective and generally preferred. In addition, a colloidal aqueous dispersion can be used but in this case additional drying time is required. In the case of other dispersion media, if the boiling point is sufficiently low and the evaporation rate within permissible limits, such media can also be utilized.

The silicon cured coat may include as little as 35% by weight of component A or as much as 75% by weight. Preferably, between about 50 and 75% by weight of component A is included. The formula of component A is preferably SiO$_2$. When the amount of component A is less than about 35 weight percent, the adhesion quality between the cured silicon coat and the anti-reflection coating deteriorates. When the amount of component A is greater than about 75% by weight, cracks are generated on the surface of the silicon hard coating. If either of these effects occur, the desirable effects that are possible in accordance with the invention are not attained. The silica concentration of the dispersion medium of component A is generally between about 20 and 35% by weight. Accordingly, the silica concentration is stable and particularly well suited for use.

In a preferred embodiment, when component A is SiO₂ the formula for Component B is:

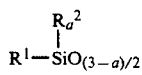

wherein $R^1$ is an organic containing epoxy group, $R^2$ is a hydrocarbon group having 0 or 1 carbon atoms and a is 0 or 1.

The silane compounds of component B include an epoxy group, preferably one of the following:

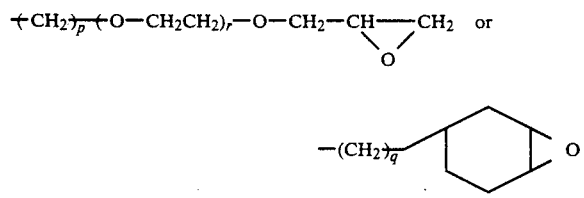

wherein p and q are 1 or 6 and r is 0 or 2. Typical examples of suitable silane compounds include:

γ-glycidoxypropyltrimethoxysilane;
γ-glycidoxypropyltriethoxysilane;
γ-glycidoxypropyl(methyl)dimethoxysilane;
γ-glycidoxypropyl(methyl)diethoxysilane;
β-(3,4-epoxycyclohexyl)ethyltrimethoxysilane and the like.

Since the alkoxy groups in these compounds are hydrolyzed when the compounds are used, the alkoxy groups can be replaced by hydroxyl groups, hydrogen, chlorine, acetoxy and the like. The compounds of component B are hydrolyzed in a colloidal silica dispersion medium such as alcohol, ketones, esters, cellosolve, carbitol and the like or their mixtures. Hydrolysis occurs by the addition of water and an acid catalyst such as hydrochloric acid, sulfuric acid, phosphoric acid, nitric acid and acetic acid.

When compounds having groups that can be easily hydrolyzed are used, it is easy to form Si—O—Si bonding by hydrolyzing the compound with atmospheric moisture or by hydrolyzing the reactive groups and condensing the compounds spontaneously in the presence of a minimal amount of water used as a catalyst. The resulting organic compound B formed by this process includes partially dehydrated and condensed polymers that exist in a homogeneous solution.

Component C is an additive for extending the shelf life of the coating solution. Organic compounds such as chelating agents of β-diketones, β-ketoesters and mixtures thereof are suitable for this purpose. Examples include acetylacetone, ethyl acetoacetate and the like. The amount of component C is preferably about 0.01% by weight with respect to the weight of the coating solution. It is to be understood that the invention is not limited by the type of additive that is used.

As the coating solution ages, the hardness of the cured silicon coating deteriorates and the shelf life of the solution is deteriorated. In order to prevent this deterioration, magnesium perchlorate is used as a potential catalyst with a chelating agent such as acetylacetone, ethyl acetoacetate and the like.

In addition, catalysts are used in order to cure at low temperatures and to reduce the curing time. Suitable well known catalysts include Bronsted acids such as hydrochloric acid, sulfuric acid and nitric acid, Lewis acids such as aluminum chloride, tin chloride, zinc borofluoride, boron fluoride, acid halide compounds, chelated compounds of acetylacetone and acetoacetate, carboxyl compounds of magnesium, titanium, zirconium and tin and perchlorates of sodium, magnesium, copper, zinc, hydrogen, lithium and the like.

The solution can also contain between about 0 and 25% by weight of additives such as ultraviolet absorbers, silicon surfactants, fluorine surfactants including flow control agents, dye agents and pigments, refractive index adjusters including epoxy compounds, polyhydroxy alcohol, metallic alcholate and titanium oxide fine particles. It is important that the desired effect of extending the shelf life is obtained, although the use of component C is not always necessary for this purpose.

Component D is optionally selected from the solvents discussed above. However, the essential properties of the silicon hard coat are obtained from components A and B.

There are several options for the method of preparation of the silicon hard coat and these are same as those discussed in connection with preparation of the primer coating. The cure reaction can be accelerated by hot air heating and cured films can easily be formed. In a preferred embodiment, curing is carried out at a temperature between about 80° C. and 150° C. for a period of between about 30 minutes and 2 ½ hours.

In addition, pre-curing using infrared ray treatment is also effective. The lens can be washed or treated chemically in acid or alkali using solvents such as alcohol, Freon ®, ozone gas and the like. It is also effective to activate the surface of the cured silicon hard coat by physical or chemical methods so that the lens is exposed to activated gas such as plasma gas or is irradiated by electron rays, ultraviolet rays and the like.

The Anti-Reflection Coating

After the cured silicon hard coating is formed on the base, an anti-reflection is formed on the silicon hard coating. A single layer or a multilayer of a thin film of a dielectric material is coated on the cured coat by means of vacuum deposition or ion sputtering. The dielectric material can be SiO, SiO₂, Si₃N₄, TiO₂, ZnO₂, CeO₂, Al₂O₃ or MgF₂. In this manner, reflection between the interface of the lens and the air is prevented. When the film is a single layer, the anti-reflection coating preferably has a thickness of λ/4, wherein λ is a wavelength between about 450 and 650 nanometers. In the case of a multilayer coating film formed of three layers, the layers should have thicknesses of λ/4; λ/2, and λ/4, respectively. In addition, thicknesses λ/4; λ/4; of and λ/4 are also effective. These anti-reflection coatings can be constructed as disclosed in U.S. Pat. No. 3,432,225. Specifically, an equivalent film constructed using two or more layers instead of three layers can also be utilized. Prior to performing the anti-reflection treatment, the surface of the lens can be cleaned or activated using an acid, alkali, organic solvent or plasma gas.

The synthetic lenses prepared in accordance with the invention have excellent impact resistance, adhesion properties, heat resistance, water resistance and oil resistance. Furthermore, since reflection from the surface of the lens is reduced, the reflectance curve is smooth and the resulting lens is suitable for use as an eyeglass lens.

In addition, the invention can be applied to several types of synthetic lens base material. In addition, ophthalmic lenses using base materials formed of resins with high refractive indices and prepared in accordance with the invention are thinner than prior art lenses.

These lenses possess superior permeability qualities and are particularly well suited for general use. Furthermore, the resulting lenses can also be used in cameras, telescopes, as panel glasses, watch glasses, transparent windowpanes and the like.

The object of achieving strong adhesion between the layers by providing a primer layer having good adhesion with the organic lens base material and the silicon abrasion resistant layer is accomplished. In addition, the abrasion resistant layer has good adhesion for the inorganic materials of the anti-reflection coating. Accordingly, properties of the lenses including water resistance, weatherability and chemical resistance are improved and reliability is increased. Another effect is that a lens having excellent impact resistance, abrasion resistance and heat resistance can be provided using a combination of the organic primer layer for imparting superior flexibility and the silicon cured layer for imparting good abrasion resistance.

The characteristics discussed above improve the quality of the synthetic materials in order to provide synthetic lenses that are suitable for use in optical instruments. Additionally, it is possible to extend the uses of the synthetic resin lenses prepared in accordance with the invention to fields where it has been difficult to use such synthetic lenses to date.

The invention will be better understood with reference to the following examples. These examples are presented for purposes of illustration only and are not intended to be construed in a limiting sense.

Preparation of base material for synthetic resin lenses.

Lenses (L1) to (L9) were either commercially available or prepared using the following method. The lens configurations were all the same as shown for lens (L1).

(L1) Polydiethylene glycol bisallyl carbonate resin lens

This is a commercially available lens sold under the trademark SEIKO PLAX LD by Seiko Epson Corporation. It is a non-coated lens, 75 mm $\phi$ −4.00 D that was designed for export to the United States. A center thickness of 2 mm was used.

(L2) Polycarbonate lens

This optical lens was formed by injection molding to the same configuration described in connection with (L1). The degree of the lens was improved to −4.75D.

(L3) Synthetic resin lens having a high refractive index and method of preparation 50 parts of styrene, 48.5 parts of 2,2-bis(3,5-dibromo-4-methacryloyloxyethoxyphenyl)propane, 2.8 parts of diethylene glycol bisallyl carbonate, 1.5 parts of t-butyl-peroxy neodecanoate, 0.2 parts of 2-(2'-hydroxy-3'-methylphenyl)benzotriazole were mixed and stirred. Insoluble matter was removed from solution by filtration and the filtrate was injected into a mold consisting of a polyvinylchloride gasket and two glass plates. The mixture was heated at 30° C. for 4 hours, linearly from 30° C. to 50° C. for 10 hours, linearly from 50° C. to 70° C. for 2 hours, maintained at 70° C. for 1 hour and then at 80° C. for 2 hours. The gasket and the glass mold were removed. The lens obtained was annealed at 110° C. for 2 hours in order to eliminate the internal strain of the lens. The lens was excellent as an optical synthetic resin lens having a high refractive index of 1.595 and the Abbe number was 34. The degree of the lens was −4.80D.

(L4) Synthetic resin lens having high refractive index and method of preparation 60 parts of styrene, 40 parts of 2,2-bis(3,5-dibromo-4-methacryloxyethoxyphenyl)propane, 3 parts of allyl cinnamate, 1.0 parts of diisopropylperoxy dicarbonate and 0.2 parts of 2-(2'- hydroxy-3'-methylphenyl)benzotriazole were mixed and stirred. The mixture was injected into a mold consisting of glass plates having a diameter of 73 cm and an ethylene/vinyl acetate copolymer gasket and was subjected to cast polymerization in an air furnace. The polymerization was performed by gradually raising the temperature from 30° C. to 50° C. over a period of 18 hours. The temperature was then raised to 70° C. over a period of 1 hour and further polymerization was carried out at 70° C. for an additional period of 1 hour. The ethylene/vinyl acetate copolymer gasket was removed and further polymerization was carried out at 100° C. for a period of 30 minutes. After polymerization, the mold was withdrawn from the air furnace and allowed to cool. The polymer was stripped from the mold and was found to have a refractive index (n $D^{20}$) of 1.6106 and a very good surface condition. The degree of the lens was −4.80D.

(L5) Synthetic resin lens having a high refractive index and method of preparation 50 parts of 2,2-bis[4-(2-allyloxycarbonyloxyethoxy)-3,5-dibromophenyl]propane, 42 parts of diallyl isophthalate, 8 parts of diethylene glycol bisallyl carbonate and 0.2 parts of 2-hydroxy-4-methoxybenzophenone were mixed and stirred. 1.2 parts of diisopropylperoxy dicarbonate was added as an initiator and mixed. Insoluble matter was removed from the mixture by filtration and injected into a mold consisting of 2 glass plates with an inside mirror and a copolymer of ethylene/vinyl acetate gasket as a seal. The filtrate was subjected to polymerization in an air furnace at a temperature of 40° C. for a period of 4 hours. The temperature was raised to 60° C. and polymerization was continued for an additional 18 hours. The temperature was raised to 90° C. and heated for 2 hours in order to complete the polymerization. The gasket and glass plate mold were removed and the surface of the lens was as smooth as a mirror. No internal strain was present. Accordingly, the lens was sufficient for use as an optical material. The refractive index was 1.583 and the degree of the lens was −4.80D.

(L6) Synthetic resin lens having a high refractive index and method of preparation 50 parts of 2,2-bis[2-allyloxycarbonyloxyethoxy)-3,5-dibromophenyl]propane, 50 parts of diallyl-orthophthalate and 0.1 parts of 2-(2'-hydroxy-5'-methylphenyl)benzotriazole were mixed and stirred. 1.2 parts of diisopropylperoxy dicarbonate was added as an initiator and mixed. Insoluble matter was removed by filtration and the mixture was injected into a mold of glass plates having an inside mirror and sealed with an ethylene/vinyl acetate copolymer gasket. The mixture was heated in an air furnace at 40° C. for 4 hours. The temperature was raised to 60° C. and polymerization was continued for 18 hours. The temperature was raised to 90° C. and polymerization was completed in an additional 2 hours. The gasket and plate glass mold were removed from the lens. The surface of the lens was as smooth as a mirror and there were no internal strains. Accordingly, the lens was sufficient for use as an optical material. The refractive index was 1.583 and the degree was −4.80D.

(L7) Acrylic lens and method of preparation

Polymethyl methacrylate resin was formed by injection molding to a lens having the configuration described as (L1). The degree of the lens was −4.00D.

(L8) Polystyrene lens and method of preparation

Polystyrene resin was formed by injection molding to a lens having the configuration described as (L1). The degree of the lens was −4.75D.

(L9) Diallylphthalate synthetic resin lens and method of preparation 100 parts of diallylphthalate, 8 parts of diethylene glycol bisallyl carbonate and 0.2 parts of 2-hydroxy-4-methoxybenzophenone were added, mixed and stirred. 0.8 parts of Benzoil peroxide were added as an initiator and mixed. The mixture was injected into a mold consisting of 2 glass plates having a mirror inside, sealed with an ethylene/vinyl acetate copolymer gasket and subjected to cast polymerization. The polymerization was performed in an air furnace at 40° C. for 2 hours. The temperature was raised to 60° C. and polymerization was continued for an additional 18 hours. Then samples were heated at 90° C. for 4 hours to complete the polymerization. The gasket and glass mold were removed from the lens. The lens obtained was excellent and sufficient for use as an optical material. The refractive index of the resin was 1.575. The degree of the lens was −4.70D.

Preparation of the primer coating solution.

The following primer coating solutions (P1) to (P4) were prepared as described below. Prior to coating, the solutions were filtered using a membrane filter having a 1 μ mesh.

(P1) Preparation of primer coating solution 800 parts of distilled water and 4 parts of dodecylbenzenesulfonic acid sodium salt (NEWREX R manufactured by Nippon Oil & Fats Co., Ltd) were placed into a 3 liter autoclave manufactured by SUS and equipped with a stirring device. The mixture was stirred at between about 40 and 60 rpm and dissolved while the temperature was maintained between about 30° C. and 35° C.

300 parts of methyl methacrylate, 200 parts of n-butyl acrylate, 200 parts of styrene that had been distilled to remove the polymerization inhibitor, and 5 parts of n-dodecyl mercaptan were added into the autoclave and dissolved. The atmosphere was replaced by nitrogen and then stirring was begun at a rate of 500 rpm. 4 parts of potassium persulfate were dissolved in 36 parts of distilled water and dripped into the autoclave mixture over a period of 1 hour. The revolution rate was reduced to 50 rpm and rotation was carried out at 80° C. for a period of 3 hours.

When the reaction was complete, 3 parts of dimethyldithiocarbamic acid sodium salt were dissolved in 100 parts of distilled water and this mixture was added to the autoclave to stop the reaction. The emulsion solution obtained had a solid content of 37% and a particle diameter of about 100 mμ. The molecular weight of the polymer was approximated from the viscosity of the emulsion solution at about 1 million.

30 parts of the emulsion solution were stirred and 60 parts of methanol were gradually added to the emulsion solution. Then 500 parts of methyl cellosolve, 10 parts of dimethylformamide and 0.05 parts of silicon surfactant (Y-7002 manufactured by Nippon Unicar Co., Ltd) were added to yield primer coating solution (P1).

(P2) Preparation of primer coating solution

Commercially available F430 having a solids content of 45% by weight (manufactured by Showa Koubunshi Co., Ltd) was used as an acrylic-styrene water emulsion. 20 parts of water emulsion were stirred intensely and 20 parts of distilled water and 20 parts of methanol were gradually added. Then 80 parts of ethyl cellosolve and 10 parts of propylene glycol monomethyl ether were added. 2.5 parts of p-t-butyl phenyl salicylate and 0.5 parts of a polymeric stabilizing agent (SANOR LS-770 manufactured by Sanyo Co., Ltd) were added. Finally, 0.2 parts of 2-(2'-hydroxy-3-methylphenyl)benzotriazole and 0.05 parts of silicon surfactant were added. Insoluble matter was removed from the solution obtained by filtration to yield primer coating solution (P2).

(P3) Preparation of primer coating solution 20 parts of commercially available SEBIAN A-4719 (Tg=30° C. and solids content of 50% manufactured by Daicel Chemical Industries, Ltd) was used as an acrylic styrene water emulsion. 30 parts water, 100 parts of methyl cellosolve, 20 parts of dimethylformamide and 0.05 parts of silicon surfactant were mixed together to yield primer coating solution (P3).

(P4) Preparation of primer coating solution 20 parts of styrene, 30 parts of methyl methacrylate, 0.8 parts of glycidyl methacrylate and 1.5 parts of n-butyl acrylate were dissolved in 100 parts of n-hexane. 0.5 parts of azobisisobutylnitrile was added as an initiator. The autoclave was degassed and closed and polymerization was performed at 40° C. for 2 hours and then at 70° C. for an additional 3 hours. 0.2 g of the initiator were added and the reaction was carried out at 70° C. for an additional 2 hours. Then 30 parts of the solution were removed and 10 parts of methanol, 50 parts of methylethylketone, 20 parts of dimethylformamide, 0.2 parts of 2-(2'-hydroxy-3'-methylphenyl)benzotriazole and 0.05 parts of silicon surfactant were added to yield primer coating solution (P4).

Preparation of Silicon Hard Coating Solution.

Silicon hard coating solutions (H1) to (H5) were prepared as described below. Prior to coating, each of the solutions were filtered through a membrane filter.

(H1) Preparation of silicon hard coating solution (H1)

parts of γ-glycidoxypropyltrimethoxysilane, 330 parts of colloidal silica dispersed in isopropanol (OS-CAL-1432 having a solids content of 30% manufactured by Catalysts & Chemicals Ind. Co., Ltd) and 220 parts of isopropanol were placed into a flask equipped with a stirring device under nitrogen atmosphere at room temperature. 52 parts of 0.05 N hydrochloric acid was added to the flask over a period of ½ hour while stirring was continued and the temperature was maintained at less than 25° C. 0.1 part of silicon surfactant (L-7604 manufactured by Nippon Unicar Co., Ltd) was added and dispersed into solution. The liquid was aged at a temperature of 0° C. for a period of 24 hours to yield coating composition (H1).

(H2) Preparation of silicon coating solution (H2)

330 parts of colloidal silica dispersed in isopropanol (OSCAL-1432), 220 parts of isopropanol and 108 parts of γ-glycidoxypropyltrimethoxysilane were added in that order to a flask equipped with a stirring device while stirring under a nitrogen atmosphere. 52 parts of 0.05 N hydrochloric acid was added drop-wise over a period of 30 minutes. 1.8 parts of magnesium perchlorate and 0.1 parts of silicon surfactant were added and the solution was aged at 0° C. for 24 hours to yield coating solution (H2).

(H3) Preparation of silicon hard coating solution (H3)

580 parts of colloidal silica dispersed in methanol (METHANOL SILICA SOL having a solids content of 30% manufactured by Nissan Chemical Industries, Ltd), 350 parts of isopropanol, 220 parts of γ-diethoxysilane, 35 parts of 0.1 N hydrochloric acid, 12 parts of acetylacetone and 0.2 parts of silicon surfactant were placed into a flask equipped with a stirring device. The mixture was stirred extensively and a yellow ocher uniform solution was obtained. The solution was aged at 0° C. for 24 hours to yield coating solution (H3).

(H4) Preparation of silicon hard coating solution (H4)

225 parts of colloidal silica dispersed in isopropanol, 100 parts of ethanol, 40 parts of γ-glycidoxypropyltrimethoxysilane and 15 parts of tetrabutoxytitanium were placed into a flask equipped with a stirring device. The mixture was stirred extensively and a homogeneous solution was obtained. 0.05 parts of N normal hydrochloric acid was added, followed by addition of 0.1 parts of 2-(2'-hydroxy-5'-methylphenyl)benzotriazole and 0.05 parts of silicon surfactant. The solution was aged at 20° C. for 24 hours in order to yield coating solution (H4).

(H5) Preparation of silicon hard coating solution (H5)

A solution containing 35 parts of glycidoxypropyltrimethoxysilane, 170 parts of colloidal silica (METHANOL SILICA SOL) and 103 parts of methyl cellosolve was hydrolyzed by the drop-wise addition of 7.5 parts of 0.05 N hydrochloric acid. The hydrolyzed solution was aged at 0° C. for 24 hours and 25 parts of glycerol diglycidyl ether (DENACOL EX 313 manufactured by Nagase Sangyo KK), 0.7 parts of magnesium perchlorate and 0.1 parts of silicon surfactant (L-7604 produced by Nippon Unicar Co., Ltd) were added to yield coating solution (H5).

Deposition of Anti-Reflection Coating

Anti-reflection coatings (R1) to (R4) obtained in the above process were deposited in the following manner in order to separate the multilayer coatings. The design wavelength was λ=510 nm for all samples.

(R1) Deposition of anti-reflection coating (R1)

Figure 1:
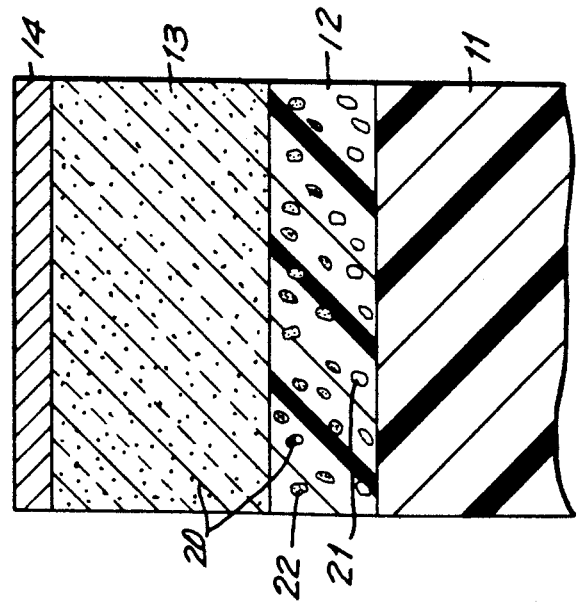
FIG. 1 is a side elevational view of a coated synthetic resin lens prepared in accordance with the invention.

A lens was exposed to argon gas plasma at 200 W for a period of 30 seconds in vacuum and an anti-reflection coating having the structure shown in FIG. 1 was deposited on the lens by vacuum deposition. From the lens to the atmosphere, thin layers of $SiO_2$, $ZrO_2$, $SiO_2$, $ZrO_2$ and $SiO_2$ were formed in order. The optical thickness of the layers was $\lambda_o/4$ for the first $SiO_2$ layer, $\lambda_o/4$ for the $ZrO_2$ and second $SiO_2$ layers together, $\lambda_o/4$ for the second $ZrO_2$ layer and $\lambda_o/4$ for the outermost $SiO_2$ layer. This anti-reflection coating is (R1).

(R2) Deposition of anti-reflection coating (R2)

A vacuum deposition process was used to deposit an anti-reflection multicoating on a cured silicon hard coat. The anti-reflection coating was formed of four layers including a first layer of $ZrO_2$, a second layer of $SiO_2$, a third layer of $ZrO_2$ and a fourth layer of $SiO_2$. The total optical thickness of the first $ZrO_2$ layer and the second $SiO_2$ layer was about $\lambda_o/4$. The optical thicknesses of each of the third $ZrO_2$ layer and the fourth $SiO_2$ layer were $\lambda_o/4$. This anti-reflection coating is (R2).

(R3) Deposition of anti-reflection coating (R3)

Anti-reflection coating (R3) was deposited on a lens by a vacuum deposition process. The anti-reflection coating was formed of four layers of $ZrO_2$, $SiO_2$, $TiO_2$ and $SiO_2$, respectively, from the lens to the atmosphere. The total optical thickness of the first $ZrO_2$ layer and the second $SiO_2$ layer was $\lambda_o/4$. The optical thickness of each of the third $TiO_2$ layer and the fourth $SiO_2$ layer was $\lambda_o/4$. This is anti-reflection coating (R3).

(R4) Deposition of anti-reflection coating (R4)

The lens was processed using oxygen plasma at 200 W for 30 seconds. An anti-reflection coating was deposited on the lens using a vacuum deposition process. The anti-reflection coating was formed of four layers including a first layer of $ZrO_2$, a second layer of $Al_2O_3$, a third layer of $ZrO_2$ and a fourth layer of $SiO_2$. The total optical thickness of the first $ZrO_2$ layer and the second $Al_2O_3$ layer was about $\lambda_o/4$. The optical thicknesses of each of the third $ZrO_2$ layer and the fourth $SiO_2$ layer was about $\lambda_o/4$. This anti-reflection coating is (R4).

Examples 1–18

Each of base lenses (L1) to (L9) was coated with primer coating solutions (P1) to (P4) as follows:

20 base lenses of each of (L1) to (L9), inclusive, were processed in oxygen plasma at 200 W, 0.2 Torr for 10 seconds. The lenses were completely washed with water and dried, taking care to keep the lenses free of dust in order to clean the surfaces.

Each lens was coated with primer coating solution in the combinations shown in Table 1.

TABLE 1

| Embodiment No. | Base Lens | Primer Coating solution | Hard Coating solution | Anti-reflection coating |
|---|---|---|---|---|
| 1 | L1 | P1 | H1 | R1 |
| 2 | L1 | P2 | H2 | R1 |
| 3 | L1 | P3 | H2 | R1 |
| 4 | L1 | P4 | H5 | R1 |
| 5 | L2 | P2 | H1 | R2 |
| 6 | L2 | P3 | H1 | R1 |
| 7 | L2 | P3 | H4 | R4 |
| 8 | L3 | P1 | H1 | R1 |
| 9 | L3 | P3 | H1 | R2 |
| 10 | L3 | P3 | H2 | R1 |
| 11 | L4 | P1 | H1 | R1 |
| 12 | L4 | P3 | H1 | R2 |
| 13 | L4 | P3 | H2 | R1 |
| 14 | L5 | P3 | H2 | R1 |
| 15 | L6 | P2 | H2 | R3 |
| 16 | L7 | P3 | H2 | R1 |
| 17 | L8 | P1 | H2 | R3 |
| 18 | L9 | P1 | H2 | R3 |

Coating was accomplished using the dipping method. Specifically, each lens was dipped in a primer coating solution at 20° C. and drawn up at a speed of 10 cm/min. The lens was dried in the atmosphere for 1 minute and then dried and cured in a heat drier oven at 100° C. for 30 minutes.

The lens was then cooled and coated with a silicon hard coating solution (H1) to (H5) in the combinations shown in Table 1 above. The temperature of the coating solutions was 5° C. and the speed of drawing up the samples was 20 cm/min. The samples were dried in the open atmosphere for 1 minute and then cured in a heat drier oven at 80° C. for 1 hour and at 100° C. for an additional 4 hours.

The lenses were cooled and plasma processed as described in connection with the deposition of anti-reflection coatings. Then anti-reflection coatings (R1) to (R4) were deposited on the lenses in the combinations shown in Table 1 above.

The primer coatings obtained were as thick as 0.6 $\mu$ for (P1), 0.5 $\mu$ for (P2) and (P3) and 0.2 $\mu$ for (P4). The thickness of the silicon hard coatings were 2.5 $\mu$ for (H1) and (H2), 3.0 $\mu$ for (H3) and 2.8 $\mu$ for (H4) and 3.5 $\mu$ for (H5). The properties of the lenses were evaluated and the results are indicated in Table 2.

TABLE 2

| Embodiment No. | (1) | (2) | (3) | (4) | (5) | (6) | (7) | (8) |
|---|---|---|---|---|---|---|---|---|
| 1 | B | 20/20 | | | 100 | | | β |
| 2 | B | 20/20 | | | 100 | | | β |
| 3 | B | 20/20 | | | 100 | | | β |
| 4 | C | 19/20 | | | 95 | | | β |
| 5 | B | 20/20 | | | 95 | | | β |
| 6 | B | 20/20 | | | 95 | | | β |
| 7 | C | 20/20 | | | 95 | | | β |
| 8 | B | 20/20 | | | 95 | | | β |
| 9 | B | 20/20 | | | 95 | | | β |
| 10 | B | 20/20 | | | 95 | | | β |
| 11 | B | 20/20 | | | 95 | | | β |
| 12 | B | 20/20 | | | 95 | | | β |
| 13 | B | 20/20 | | | 95 | | | β |
| 14 | B | 20/20 | | | 95 | | | β |
| 15 | B | 20/20 | | | 95 | | | β |
| 16 | B | 20/20 | | | 95 | | | β |
| 17 | B | 18/20 | | | 90 | | | β |
| 18 | B | 17/20 | | | 90 | | | β |
| 19 | B | 20/20 | | | 100 | | | β |
| 20 | B | 20/20 | | | 95 | | | β |
| 21 | B | 20/20 | | | 95 | | | β |
| 22 | B | 20/20 | | | 90 | | | β |
| 23 | B | 20/20 | | | 100 | | | α |
| 24 | B | 20/20 | | | 100 | | | α |
| 25 | B | 20/20 | | | 100 | | | α |
| 26 | B | 20/20 | | | 100 | | | α |
| 27 | B | 20/20 | | | 100 | | | α |
| 28 | B | 20/20 | | | 100 | | | α |
| 29 | B | 20/20 | | | 100 | | | α |
| 30 | B | 19/20 | | | 99 | | | α |
| 31 | B | 19/20 | | | 100 | | | α |
| 32 | B | 19/20 | | | 100 | | | α |
| 33 | B | 19/20 | | | 100 | | | α |
| 34 | B | 20/20 | | | 95 | | | α |
| 35 | B | 19/20 | | | 100 | | | α |
| 36 | B | 20/20 | | | 100 | | | α |
| 37 | B | 20/20 | | | 100 | | | α |
| 38 | B | 19/20 | | | 95 | | | α |

In Table 5, shows "good" and X shows "there are defects".

The tests set forth in Table 2 were as follows:

1. Abrasion Resistance

Each lens was cut into test pieces having a rectangular shape of 1×3 cm. The test pieces were rubbed with #0000 gauge steel wool back and forth ten times under a load of 1 kg. Each test piece was examined to classify it into grades A to E according to the scratches and scars formed on the surface by the steel wool. The grades were as follows:

A: The rubbed lens exhibited no scratches or scars within the 1×3 cm rectangle;
B: The rubbed lens exhibited from 1 to 10 scratches or scars within the 1×3 cm rectangle;
C: The rubbed lens exhibited from 10 to 100 scratches or scars within the 1×3 cm rectangle;
D: The rubbed lens exhibited innumerable scratches and scars, with some parts of the surface remaining smooth; and
E: The rubbed lens had innumerable scratches and serious scars with none of the surface remaining smooth.

2. Impact Resistance

The "falling steel ball test" as defined by the U.S. Food and Drug Administration was conducted on the lens. A ⅝" steel ball was dropped onto the central portion of the lens from a height of 50 inches. The lens was then examined to determine whether or not it had broken. The test was repeated 3 times and lenses which did not exhibit any change in the exterior surface were considered to be excellent. The thickness of the lenses employed was 2 mm. As shown in Table 2 above, the denominator is the total number of test samples and the numerator is the number of samples which exhibited good results.

3. Water and Chemical Resistance

The coated lenses were dipped into water, alcohol and kerosene for 48 hours and the surfaces were examined.

4. Weatherability

The coated lenses were exposed to a xenon lamp from a Sunshine weather-meter for 200 hours and examined.

5. Adhesion Properties

The adhesion properties between the lens and the primer coat, the primer coat and the cured coat, and the cured coat and the anti-reflection coating were examined by a cross-cut tape test according to JISD-0202. For this test, the surface of the lens was cut into 100 squares with a knife, each having an area of 1 mm ×1 mm. A cellophane adhesive-backed tape (CELLOTAPE manufactured by Nitto Chemical Co., Ltd) was applied to the cut surface and removed in the direction of 90° with respect to the lens surface. Adhesion was evaluated by the ratio of the number of squares remaining on the surface to the initial number of 100 squares.

6. Durability

Durability was considered as maintenance of the adhesion properties. Each lens was examined in accordance with tests (1) to (4) and then subjected to the cross-cut tape test. Durability was evaluated based on this.

7. Heat Resistance (Heat Shock Test)

The coated lens was placed into a hot air oven at a temperature of 70° C. for 1 hour. Then the exterior appearance of the lens was examined. The coated lens was then placed in a hot air oven cycled from 5° C. for 15 minutes and 60° C. for 15 minutes. The heating cycle was repeated 5 times. The exterior appearance was examined and the cross-cut tape test was conducted. A lens showing no squares peeling on the surface was considered excellent.

8. Observation of Lens Section

The surface portion of the lens was micro-sliced into the direction vertical to the lens surface to a thickness of 0.1 $\mu$ and a leaf section was observed using a transmission electron micrograph (TEM) to see if there were any defects in the layer structure. $\alpha$ and $\beta$ indicate that no defects were seen and that diffusion of the silicon constituents into the primer coating was seen or not seen, respectively.

Examples 19-22

Lenses were prepared as described in Examples 1, 3, 6 and 8, respectively, except that plasma processing of the base lens was not performed. The combination of the base lens, primer coating solution, hard coating solution and anti-reflection coating are set forth in Table 3.

TABLE 3

| Embodiment No. | Base Lens | Primer Coating Solution | Hard Coating Solution | Anti-reflection Solution |
|---|---|---|---|---|
| 19 | L1 | P1 | H1 | R1 |
| 20 | L1 | P3 | H2 | R1 |
| 21 | L2 | P3 | H1 | R1 |
| 22 | L3 | P1 | H1 | R1 |

The same evaluations were used as for Examples 1-18 and the results are set forth in Table 2 above.

Examples 23-35

Base lenses (L1) to (L9) were coated with primer coating solutions (P1) to (P3) as follows:

20 base lenses of each of standards (L1) to (L9) were processed using oxygen plasma at 200 W, 0.2 torr for 10 seconds. The processed lenses were completely washed with water and dried and care was taken to keep the lens surface free of dust in order to clean the surface.

In a room having a relative humidity of 60% and a temperature of 20° C., the lenses were dipped into primer coating solutions and drawn up at a speed of 8 cm/min in order to coat the lens with the primer coating solution. THe coated lenses were subjected to open air drying for 3 minutes and the primer coating was then semi-cured in a heat drier oven at 60° C. for 30 minutes. The primer coating was found to be transparent and tack-free.

The silicon hard coating solutions (H1) to (H5) were coated on top in the combinations shown in Table 4.

TABLE 4

| Embodiment No. | Base Lens | Primer Coating Solution | Hard Coating Solution | Anti-Reflection Solution |
|---|---|---|---|---|
| 23 | L1 | P1 | H1 | R1 |
| 24 | L1 | P2 | H2 | R1 |
| 25 | L1 | P3 | H2 | R1 |
| 26 | L1 | P3 | H3 | R3 |
| 27 | L1 | P3 | H5 | R1 |
| 28 | L2 | P1 | H1 | R2 |
| 29 | L2 | P2 | H2 | R1 |
| 30 | L3 | P1 | H1 | R1 |
| 31 | L3 | P3 | H1 | R2 |
| 32 | L4 | P3 | H1 | R2 |
| 33 | L4 | P3 | H2 | R1 |
| 34 | L5 | P3 | H2 | R1 |
| 35 | L7 | P3 | H2 | R1 |

The lenses were cured in the same manner as in embodiments 1-18. Anti-reflection coatings were deposited as described.

The thickness of the primer coatings was 0.5 $\mu$ for (P1) and 0.4$\mu$ for (P2) and (P3), respectively. The thicknesses of the hard coatings were about the same as in Examples 1-18. The evaluation tests used for Examples 1-18 were performed and the results are shown in Table 2 above.

Figure 2:
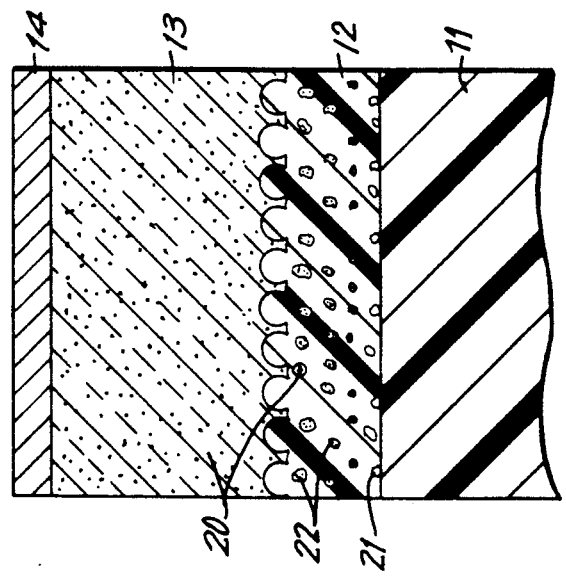
FIG. 2 is a side elevational view of a coated synthetic resin lens prepared in accordance with an alternate embodiment of the invention.

A cross-sectional view of a coated lens prepared in accordance with Example 1 and 23 shown in FIG. 1 and 2 wherein reference numeral 11 designates the base material, 12 is the primer coating, 13 is the silicon hard coat and 14 is the anti-reflection coating. Additionally, 20 designates the silicon constituent, 21 is the emulsion constituent that forms a uniform coating as the result of a heating process and 22 shows emulsion grains that form a porous film by a partial softening.

Figure 4:
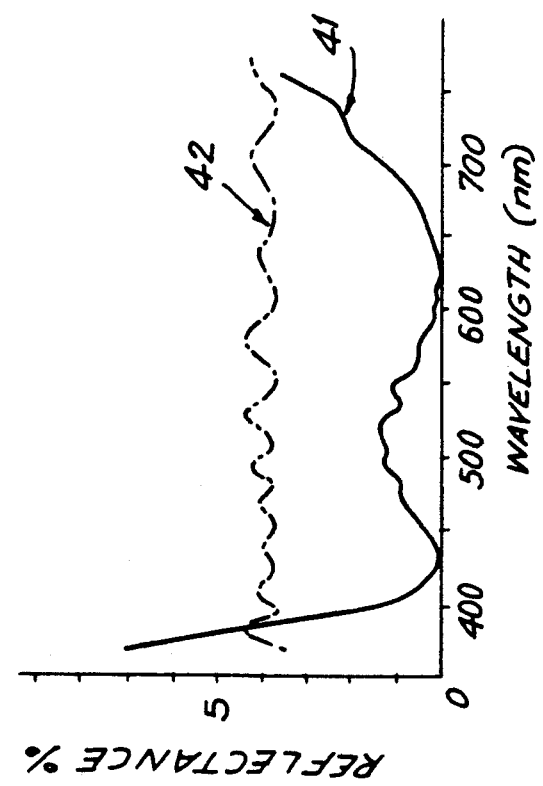
FIG. 4 is a graph showing percent reflectance as a function of wave length of incident light for a lens prepared in accordance with the embodiment shown in FIG. 2.

Furthermore, FIG. 4 is a graph showing the spectral reflectance of visible light (450 to 700 nm) by one side of a lens prepared in accordance with Example 23 wherein curve 41 represents the lens prepared in accordance with the Example and curve 42 represents the same lens prior to providing an anti-reflection coating. The abscissa of the graph is wavelength (nm) and the ordinate is light reflectance (%).

Figure 5:
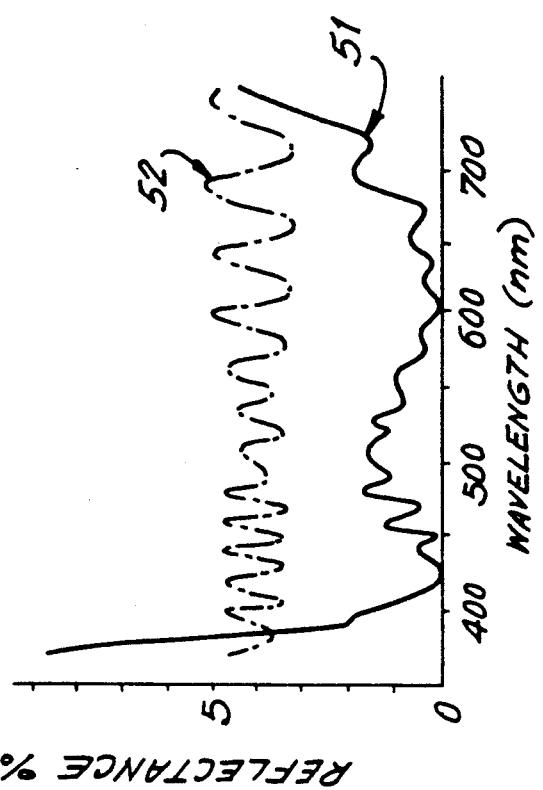
FIG. 5 is a graph showing percent reflectance as a function of wave length of incident light for a lens prepared in accordance with an alternate embodiment of the invention.

In a similar manner, FIG. 5 shows the spectral reflectance of visible light of one side of a lens prepared in accordance with Example 30 wherein curve 51 shows the spectral reflectance of the lens prepared in accordance with Example 30 and curve 51 shows the spectral reflectance of the same lens prior to providing an anti-reflection coating. As before, the abscissa of the graph is wavelength (nm) and the ordinate is light reflectance (%).

Examples 36-38

Lenses were prepared as described in Examples 23, 25 and 30, respectively, except that the base lens was not plasma processed. The combination of base lenses, primer coating solution, hard coating solution and anti-reflection coating are shown in Table 5.

TABLE 5

| Embodiment No. | Base Lens | Primer Coating Solution | Hard Coating Solution | Anti-Reflection Coating |
|---|---|---|---|---|
| 36 | L1 | P1 | H1 | R1 |
| 37 | L1 | P3 | H2 | R1 |
| 38 | L3 | P1 | H1 | R1 |

The evaluation tests used for Examples 1-18 were performed and the results are indicated in Table 2 above.

Comparative Examples 1-13

Plasma processing and washing were performed on base lenses (L1) to (L9) as described with respect to Examples 1-18. Silicon hard coatings and anti-reflection coatings were provided on the lenses without primer hard coatings. The specific coatings are shown in Table 6.

TABLE 6

| Comparative Embodiment No. | Base Lens | Hard Coating Solution | Anti-Reflection Coating |
|---|---|---|---|
| 1 | L1 | H1 | R1 |
| 2 | L1 | H2 | R1 |
| 3 | L1 | H5 | R1 |
| 4 | L2 | H1 | R2 |

TABLE 6-continued

| Comparative Embodiment No. | Base Lens | Hard Coating Solution | Anti-Reflection Coating |
| --- | --- | --- | --- |
| 5 | L2 | H4 | R5 |
| 6 | L3 | H1 | R1 |
| 7 | L3 | H2 | R1 |
| 8 | L4 | H1 | R1 |
| 9 | L5 | H2 | R1 |
| 10 | L6 | H2 | R3 |
| 11 | L7 | H2 | R1 |
| 12 | L8 | H2 | R3 |
| 13 | L9 | H2 | R3 |

The conditions for coating, curing and deposition of the coatings are the same as those shown in Examples 1-18, respectively.

A cross-sectional view of a coated lens prepared in accordance with Comparative Example 1 is shown in FIG. 3 wherein reference numeral 31 is the base material, 32 is the silicon hard coat and 33 is the anti-reflection coating.

The evaluation tests used for Examples 1-18 were performed on the samples and the results are shown in Table 7.

TABLE 7

| Relative Embodiment No. | Test No. | | | | | | |
| --- | --- | --- | --- | --- | --- | --- | --- |
| | (1) | (2) | (3) | (4) | (5) | (6) | (7) |
| 1 | B | 15/20 | | | 100 | | |
| 2 | B | 10/20 | | | 100 | | |
| 3 | C | 10/20 | | | 100 | | |
| 4 | B | 10/20 | | | 0 | X | X |
| 5 | C | 18/20 | | | 0 | X | X |
| 6 | B | 0/20 | | | 0 | X | X |
| 7 | B | 0/20 | | | 0 | X | X |
| 8 | B | 0/20 | | | 0 | X | X |
| 9 | B | 0/20 | | | 0 | X | X |
| 10 | B | 0/20 | | | 0 | X | X |
| 11 | C | 0/20 | | | 10 | X | |
| 12 | B | 0/20 | | | 0 | X | X |
| 13 | B | 0/20 | | | 0 | X | X |
| 14 | B | 20/20 | X | | 100 | X | |
| 15 | B | 20/20 | X | | 0 | X | X |
| 16 | B | 18/20 | X | | 0 | X | X |
| 17 | B | 15/20 | X | | 0 | X | X |
| 18 | B | 15/20 | X | | 0 | X | X |
| 19 | B | 10/20 | X | | 0 | X | X |
| 20 | C | 20/20 | X | | 0 | X | X |
| 21 | B | 10/20 | X | | 0 | X | X |
| 22 | B | 10/20 | X | | 0 | X | X | shows "good" and X shows "there are defects".

Comparative Examples 14-22

For purposes of comparison, primer coating solution (P5) was prepared by mixing 30 parts of commercially available SEBIAN 4635 (produced by Daicel Chemical Industries, Ltd. and having a solids content of 35% by weight) as the acrylic water-based emulsion, 20 parts of water, 100 parts of methyl cellosolve, 20 parts of dimethylformamide and 0.03 parts of silicon surfactant.

This primer coating (P5) was deposited on each of base lenses (L1) to (L9) on which plasma processing had been performed as described in Examples 1-18. The conditions for coating and curing were the same as those in Example 1.

A silicon hard coating (H1) and anti-reflection coating (R1) were provided as described in Example 1. The base lenses for each example are shown in Table 8.

TABLE 8

| Comparative Example No. | Base Lens |
| --- | --- |
| 14 | L1 |
| 15 | L2 |
| 16 | L3 |
| 17 | L4 |
| 18 | L5 |
| 19 | L6 |
| 20 | L7 |
| 21 | L8 |
| 22 | L9 |

Comparative Example 23

This lens was prepared as described in Example 1 except that commercially available polycarbonate primer, PRIMER PC (produced by Shinetu Chemical Co., Ltd.), was used in place of primer solution (P1). In an adhesion test of the resulting lens, the primer coating peeled out of the hard coating. Accordingly, the primer used in this example was not satisfactory for applying a silicon hard coating in accordance with this invention.

Comparative Example 24

An inorganic hard coating layer of SiO having a thickness of 1 m$\mu$ was formed on a CR-39 lens. An anti-reflection coating was applied to the lens in accordance with the procedures described in R2. In a shock-resistance test all 20 samples were destroyed.

Example 39

15 parts of 1,3,3-trimethylno-8-bromo-6'-bromobenzopyrylospiran, 5 parts of 1,3,3-trimethylindolino-7'-nitro-benzopyrylospiran and 10 parts of 1,3,3-trimethylindolino-5'-nitro-8'-mehtylbenzopyrylospiran were added into a silicon hard coating composition (H1). The composition was stirred for 2 hours in order to provide a coating composition have good photochromic properties.

Primer coated lens (L1) was cleaned with a neutral detergent as described in Comparative Example 23 and dipped into the coating composition. The lens was lifted out of the coating composition at a lifting speed of 40 cm/min. After coating, the dipped lens was dried and cured and an anti-reflection treatment was performed as described in Example 1.

The resulting lens instantly became brown when exposed to sunlight and transparent when placed in a dark environment or at a temperature of 70° C. Such coloring and discoloring was repeated 10 times and good photochromic properties were observed.

Example 40

The procedures of Comparative Example 23 were following for coating a tinted colored plastic lens (SEIKO PLAX BROWN HALF manufactured by Seiko Epson Co., Ltd.) in place of the transparent (L1) lens. An anti-reflection coating was deposited on the cured coat. After coating, heating, deposition and cleaning, the dye concentration was lowered by about 1%. However, the lens properties remained excellent.

The coated lens was tested in accordance with the tests described in Example 1 and the results were good.

Comparative Example 25

A lens having an anti-reflection coating was prepared in the same manner as in Example 1 except that primer coating (P1) an hard coating (H1) were not provided. In the shock-resistance test, 15 of 20 samples were destroyed. In the abrasion-resistance test, the lens was classified as grade D. Accordingly, the lens of this example was not suitable for practical use.

Comparative Example 26

(H6) Preparation of silicon hard coating composition (H6)

80 parts of γ-glycidoxypropyltrimethoxysilane, 144 parts of methyl trimethoxysilane, 71 parts of colloidal silica having a solids content of 20% by weight (SNOWTEX-C manufactured by Nissan Chemical Industry Co., Ltd.) and 170 parts of aqueous 0.1 N hydrochloric acid were mixed and refluxed at a temperature between about 80° and 85° C. for a period of 2 hours in order to effect hydrolysis. The resultant solution was found to contain 12.2% of γ-glycidoxypropyltrimethoxysilane hydrolyzate calculated as

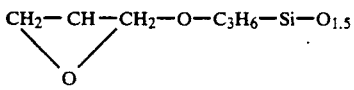

15.3% of methyltrimethoxysilane hydrolyzate calculated as $CH_3SiO_{1.5}$, and 3.1% of colloidal silica calculated as $SiO_2$. An $CH_3SiO_{1.5}$, and 3.1% of colloidal silica calculated as $SiO_2$. An cellosolve and 1.3 parts of ammonium perchlorate to 410 parts of the solution of three component hydrolyzate.

(P6) Preparation of Primer Coating Composition (P6)

0.4 parts of azo-bis-isobutylnitrile were dissolved in 230 parts of ethyl cellosolve, 30 parts of 2-hydroxyethyl methacrylate and 70 parts of glycidyl methacrylate. The mixture was stirred in a nitrogen atmosphere at 90° C. for 4 hours in order to effect copolymerization.

Primer coating composition (P6) was obtained by addition of 9 parts of the solution of 2-hydroxyethyl methacrylate and dimethylaminoethyl methacrylate obtained during the preparation of the undercoating composition, 1,520 parts of ethyl cellosolve and a small amount of a flow agent to 52 parts of the solution obtained.

A polycarbonate lens was prepared as described in Example 6 except that primer (P6) and hard coat (H6) were used in place of primer (P3) and hard coat (H1).

The lens was of fairly good quality. However, in the adhesion test, peeling was observed between the anti-reflection coating (R1) and the silicon hard coating. Additionally, in the water-resistance test, "orange peel" was observed on the lens surface.

As described in accordance with the invention, specific primer coating compositions are used for assuring strong adhesion between the silicon cured coating and the lens. In addition, excellent abrasion-resistance of the synthetic lens material is obtained. In order to provide the strongest adhesion, formation of a uniform layer of primer coating on which a silicon hard coating is formed is mot effective.

When the silicon hard coating is provided after the semicured primer coating is formed, long lasting adhesion properties between coatings is assured. In providing these layers, curing is completed in such a way that the silicon cured layer is impregnated into part of the primer coating. Furthermore, by using a silicon resin constituent having excellent chemical resistance, the chemical and water-resistance of the primer coating is greatly improved. Accordingly, by using the techniques of the invention, abrasion-resistant synthetic resin lenses as well as other articles including plastic panels and plastic films can be manufactured for commercial use.

It will thus be seen that the objects set forth above among those made apparent from the preceding description, are efficiently attained and, since certain changes may be made in the above article without departing from the spirit and scope of the invention, it is intended that all mater contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A coated synthetic resin lens comprising:
a synthetic resin lens body;
a primer coating formed of a copolymer of (1) at least 20% by weight of one of an acrylic and methacrylic monomer and (2) at least 10% by weight of an aromatic vinyl compound and having a thickness of between about 0.1 and 2 μ;
a cured coat including colloidal silica having a solids content between about 35 and 75% by weight, an organic silane compound containing epoxy groups and having a solids content between about 25 and 50% by weight, additives having a solids content between about 0 and 25% by weight and between about 60 and 80% by weight of a solvent in a coating solution; and
a dielectric anti-reflection layer formed on the cured coat,
wherein the synthetic resin lens body is selected from the group consisting of:
polydiethylene glycol bisallyl carbonate resin;
polycarbonate resin;
synthetic reins prepared from a copolymer formed by radical-polymerizing comonomers of formula I and II:

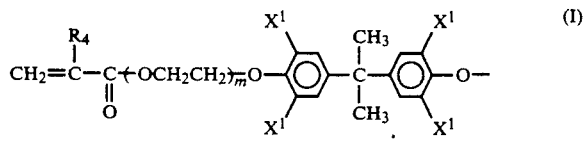

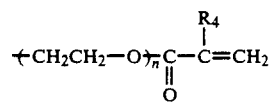

wherein $R_4$ is hydrogen or methyl, $X^1$ and $X^2$ are hydrogen or halogen other than fluorine, and m and n are both integers having a total between 0 and 8, inclusive;

a resin material formed by radical polymerizing co-monomers of formulae III, IV and V as major constituents;

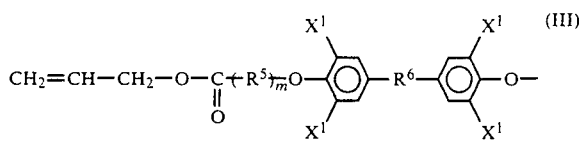

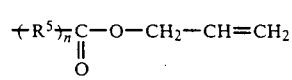

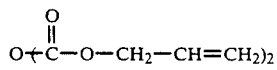

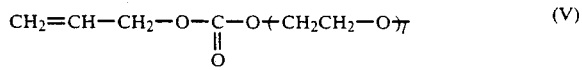

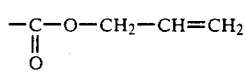

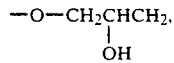

wherein $R^5$ is $-O-C_2H_4-$, $-O-C_3H_3-$ or $-O-CH_2CHCH_2$
         $|$
         $OH$ $R^6$ is $-O-$, $-S-$, $SO_2-$, $-CH_2-$ or $-C(CH_3)_2$, $X^1$ is hydrogen or a halogen other than fluorine, l is an integer between 1 and 10, inclusive and m and n are both integers having a total between about 0 and 8, inclusive;

polymethyl methacrylate resin;
polystyrene resin; and
diallyl phthalate resin.

2. The synthetic resin lens of claim 1, wherein the acrylic monomers are esters of acrylic acid and at least one of methanol, ethanol, isopropanol, n-butanol or aromatic compounds containing hydroxyl groups.

3. The synthetic resin lens of claim 1, wherein the methacrylic monomers are esters of methacrylic acid and at least one of methanol, ethanol, isopropanol, n-butanol or aromatic compounds containing hydroxyl groups.

4. The synthetic resin lens of claim 1, wherein the aromatic vinyl compound is at least one compound selected from the group consisting of styrene, chlorostyrene and bromostyrene.

5. The synthetic resin lens of claim 1, wherein the copolymer includes at least 20% by weight of methyl methacrylate and at least 10% by weight of styrene.

6. The synthetic resin lens of claim 1, wherein the copolymer is emulsion polymerized in an aqueous solution.

7. The synthetic resin lens of claim 6, wherein the copolymer has a particle diameter between about 10 and 200 μm.

8. The synthetic resin lens of claim 6, wherein the copolymer further includes an ultraviolet absorber.

9. The synthetic resin lens of claim 6, wherein the primer coating composition further includes one of a silicon surfactant or a fluorine surfactant.

10. The synthetic resin lens of claim 6, wherein the concentration of primer coating composition is between about 2 and 10% by weight.

11. The synthetic resin lens of claim 1, wherein the primer coating is dried and cured at a temperature between about room temperature and 100° C. for a period of between about 5 minutes and 2 hours.

12. The synthetic resin lens of claim 1, wherein the organic silane compound is a mixture of silane compounds represented by the general formula:

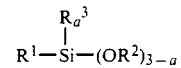

wherein $R^1$ is an organic containing epoxy group, $R^2$ is a hydrocarbon group having 0 or 1 carbon atoms, an alkoxyalkyl group or an acyl group having 0 or 1 carbon atoms, $R^3$ is a hydrocarbon group having from 1 to 4 carbon atoms and a is 0 or 1.

13. The synthetic resin lens of claim 1, wherein the colloidal silica is in the form of $SiO_2$ and the organic silane compound is in the form of:

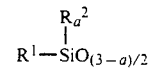

wherein $R^1$ is an organic containing epoxy group, $R^2$ is a hydrocarbon group having 0 or 1 carbon atoms and a is 0 or 1.

14. The synthetic resin lens of claim 1, wherein the epoxy group has the form:

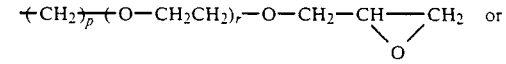

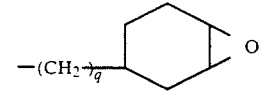

wherein p and q are 1 or 6 and r is 0 or 2.

15. The synthetic resin lens of claim 1, wherein a curing catalyst selected from the group consisting of hydrochloric acid, sulfuric acid, nitric acid, aluminum chloride, tin chloride, zinc borofluoride, boron fluoride, acid halide compounds, chelated compounds of acetylacetone and acetoacetate, carboxyl compounds of magnesium, titanium, zirconium and tin and perchlorates of sodium, magnesium, copper, zinc, hydrogen and lithium is used to reduce curing time.

16. The synthetic resin lens of claim 1, further including an effective amount of an additive selected from the group consisting of ultraviolet absorbers, silicon surfactants, fluorine surfactants, flow control agents, dye agents, pigments, refractive index adjusters, epoxy compounds, polyhydroxy alcohol, metallic alcholate and titanium oxide fine particles.

17. The synthetic resin lens of claim 1, wherein the dielectric material is SiO, $SiO_2$, $Si_3N_4$, $TiO_2$, $ZnO_2$, $CeO_2$, $Al_2O_3$, or $MgF_2$.

18. The synthetic resin lens of claim 1, wherein the anti-reflection coating has an optical thickness of λ4 wherein, λ is a wavelength between about 450 and 650 nm and the anti-reflection coating includes at least three layers including a middle index layer formed from an equivalent film of high index material and low index material.

19. A coated synthetic resin lens, comprising:

a synthetic resin lens body, wherein the synthetic resin lens body is selected from the group consisting of polydiethylene glycol bisallyl carbonate resin; polycarbonate resin; synthetic resins prepared from a copolymer formed by radical-polymerizing comonomers of formulae I and II;

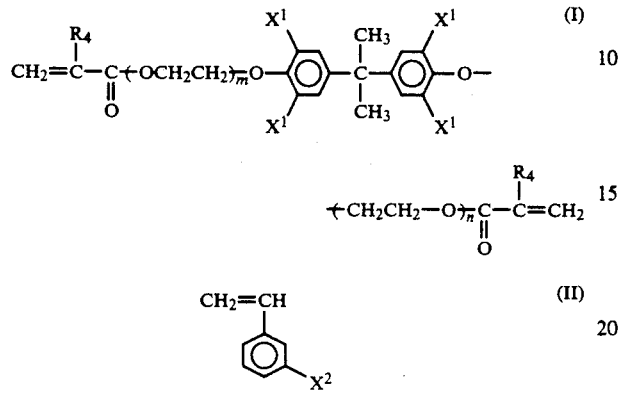

wherein $R^4$ is hydrogen or methyl, $X^1$ and $X^2$ are hydrogen or halogen other than fluorine, and m and n are both integers having a total between 0 and 8, inclusive; a resin material formed by radical polymerizing co-monomers of formulae III, IV and V as major constituents:

$$CH_2=CH-CH_2-O-\underset{\underset{O}{\|}}{C}+R^5\!\!\underset{m}{\rightarrow}O\!\!-\!\!\bigcirc\!\!-\!\!R^6\!\!-\!\!\bigcirc\!\!-\!\!O- \quad (III)$$
$$X^1 \quad\quad X^1$$

$$+R^5\!\!\underset{n}{\rightarrow}\underset{\underset{O}{\|}}{C}-O-CH_2-CH=CH_2$$

$$O+\underset{\underset{O}{\|}}{C}-O-CH_2-CH=CH_2)_2 \quad (IV)$$

$$CH_2=CH-CH_2-O-\underset{\underset{O}{\|}}{C}-O+CH_2CH_2-O\!\!\underset{n}{\rightarrow} \quad (V)$$

$$-\underset{\underset{O}{\|}}{C}-O-CH_2-CH=CH_2$$

wherein $R^5$ is $-O-C_2H_4-$, $-O-C_3H_3-$ or $$-O-CH_2\underset{\underset{OH}{|}}{CH}CH_2,$$

$R^6$ is $-O-$, $-S-$, $-SO_2-$, $-CH_2-$ or $-C(CH_3)_2-$, is halogen other than hydrogen or fluorine to read $X^1$ is hydrogen or a halogen other than fluorine, l is an integer between 1 and 10, inclusive and m and n are both integers having a total between about 0 and 8, inclusive; polymethyl methacrylate resin; polystyrene resin; and diallyl phthalate resin;

an impact resistant and adhesion promoting organic primer coating of a copolymer of at least 10% by weight of at least one aromatic vinyl compound and at least 20% by weight of at least one of an acrylic and a methacrylic monomer deposited on the lens body, the primer coating having a thickness of between about 0.1 to 2 μ;

a cured coat, wherein the cured coat includes colloidal silica having a solids content between about 35 and 75% by weight, an organic silane compound including epoxy groups and having a solids content between about 25 and 50% by weight, additives having a solids contents between about 0 and 25% by weight and between about 60 and 80% by weight of a solvent in a coating solution deposited on the primer coating; and an anti-reflection layer deposited on the cured coat.

20. A method of preparing a synthetic resin lens comprising:

providing a synthetic resin lens body selected from the group consisting of polydiethylene glycol bisallyl carbonate resin, polycarbonate resin, synthetic resins prepared from a copolymer formed by radical-polymerizing comonomers of formulae I and II;

$$\underset{\underset{\underset{O}{\|}}{R_4}}{CH_2=C-C}+OCH_2CH_2\!\!\underset{m}{\rightarrow}O\!\!-\!\!\bigcirc\!\!\underset{\underset{CH_3}{|}}{\overset{\overset{CH_3}{|}}{C}}\!\!-\!\!\bigcirc\!\!-\!\!O- \quad (I)$$
$$X^1 \quad\quad X^1$$

$$+CH_2CH_2-O\!\!\underset{n}{\rightarrow}\underset{\underset{O}{\|}}{C}-\underset{\underset{R_4}{|}}{C}=CH_2$$

$$CH_2=CH \quad (II)$$
$$\bigcirc\!\!-\!\!X^2$$

wherein $R_4$ is hydrogen or methyl, $X^1$ and $X^2$ are hydrogen or halogen other than fluorine, and m and n are both integers having a total between 0 and 8, inclusive; a resin material formed by radical polymerizing co-monomers of formulae III, IV and V as major constituents:

$$CH_2=CH-CH_2-O-\underset{\underset{O}{\|}}{C}+R^5\!\!\underset{m}{\rightarrow}O\!\!-\!\!\bigcirc\!\!-\!\!R^6\!\!-\!\!\bigcirc\!\!-\!\!O- \quad (III)$$
$$X^1 \quad\quad X^1$$

$$+R^5\!\!\underset{n}{\rightarrow}\underset{\underset{O}{\|}}{C}-O-CH_2-CH=CH_2$$

$$O+\underset{\underset{O}{\|}}{C}-O-CH_2-CH=CH_2)_2 \quad (IV)$$

$$CH_2=CH-CH_2-O-\underset{\underset{O}{\|}}{C}-O+CH_2CH_2-O\!\!\underset{n}{\rightarrow} \quad (V)$$

$$-\underset{\underset{O}{\|}}{C}-O-CH_2-CH=CH_2$$

wherein $R^5$ is $-O-C_2H_4-$, $-O-C_3H_3-$ or

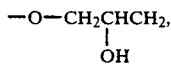

$R^6$ is —O—, —S—, —SO$_2$—, —CH$_2$— or —C(CH$_3$)$_2$—, $X^1$ is hydrogen or a halogen other than fluorine, is an integer between 1 and 10, inclusive and m and n are both integers having a total between about 0 and 8, inclusive, polymethyl methacrylate resin, polystyrene resin, and diallyl phthalate resin;

depositing a primer coating on the synthetic resin lens body, said primer coating having a thickness of between about 0.1 and 2 μ and including a copolymer of (1) at least 20% by weight of one of an acrylic and methacrylic monomer and (2) at least 10% by weight of an aromatic vinyl compound;

depositing a cured coat on the primer coating including colloidal silica having a solids content between about 35 and 75% by weight, an organic silane compound containing epoxy groups and having a solids content between about 25 and 50% by weight, additives having a solids content between about 0 and 25% by weight and between about 60 and 80% by weight of a solvent in a coating solution; and forming a dielectric anti-reflection layer on the cured coat.

21. The method of claim 20, wherein the primer coating is deposited on the lens body by dipping.

22. The method of claim 21, wherein the lifting speed after dipping is between about 2 and 40 cm/min.

23. The method of claim 20, wherein the primer coating is deposited on the lens body by dipping.

24. The method of claim 23, wherein the rotation rate is between about 500 and 4000 rpm.

25. The method of claim 20, wherein the primer coating is deposited on the lens body by spraying.

26. The method of claim 20, wherein the primer coating is deposited on the lens body by flow coating.

27. The method of claim 20, wherein the colloidal silica is cured at a temperature between about 80° C. and 150° C. for a period of between about 30 minutes and 2 ½ hours.

28. The method of claim 20, wherein the synthetic resin lens body having a primer coating deposited thereon is heated at a temperature between about 60° C. and 100° C.

29. The method of claim 20, wherein the primer coating includes gaps between particles of the coating and the colloidal silica of the surface hard coating is disposed into the gaps of the primer coating prior to curing.

30. The method of claim 28, wherein the primer coated lens body is heated to a temperature less than about 50° C. higher than the glass transition temperature under conditions of relative humidity at 20° C. of greater than about 35% for a period of between about 5 and 120 minutes in order to form a semi-cured polymer coating prior to depositing the surface hard coating.

* * * * *